United States Patent [19]

Bux et al.

[11] Patent Number: 5,319,648
[45] Date of Patent: Jun. 7, 1994

[54] CONTROL FLOW REDUCTION IN SELECTIVE REPEAT PROTOCOLS

[75] Inventors: Werner K. Bux, Richterswil, Fed. Rep. of Germany; Parviz Kermani, South Salem, N.Y.; Wolfgang B. Kleinoeder, Richterswil, Fed. Rep. of Germany

[73] Assignee: International Business Machines Corporation, Armonk, N.Y.

[21] Appl. No.: 297,441

[22] Filed: Jan. 13, 1989

[30] Foreign Application Priority Data

Jan. 22, 1988 [EP] European Pat. Off. ........ 88100940.1

[51] Int. Cl.$^5$ ............................................. G08C 25/02
[52] U.S. Cl. ...................................................... 371/32
[58] Field of Search .................................... 371/32, 33

[56] References Cited

U.S. PATENT DOCUMENTS 3,593,281 7/1971 Van Duuren et al. ............... 371/32
4,422,171 12/1983 Wortley et al. ....................... 371/32
4,439,859 3/1984 Donnan ................................. 371/32
4,601,035 7/1986 Marzec et al. ........................ 371/32
4,779,274 10/1988 Takahashi et al. ................... 371/32

Primary Examiner—Charles E. Atkinson
Attorney, Agent, or Firm—Joscelyn G. Cockburn

[57] ABSTRACT

In the Checkpoint Mode Protocol (CPM), checkpoint frames are transmitted at regular intervals for acknowledging received information frames and individually requesting retransmission of missing information frames. The disclosed invention reduces the flow of checkpoint frames in situations where their information is not required. This is achieved by either sending a Stop Checkpointing frame from sender to receiver in particular situations, or by inserting, in the case of duplex transmission (i.e. both stations are sending and receiving), Request-Reply bits into normal checkpoint frames for suppressing the flow of checkpoint frames when they are not necessary. In each case, provisions are made to resume the transmission of checkpoint frames as soon as they are required again.

4 Claims, 10 Drawing Sheets

RETRANSMIT TABLE

FIG. 4

| N(S) | V(T) |
|------|------|
| 33 | 34 |
| 34 | 35 |
| 35 | 42 |
| 36 | 37 |
| 37 | 42 |
| 38 | 39 |
| 39 | 40 |
| 40 | 45 |
| 41 | 42 |
| 42 | 43 |
| 43 | 44 |
| 44 | 45 |
| 45 | 46 |

RECEIVE TABLE

FIG. 5

| N(S) | RCV |
|------|-----|
| 29 | 1 |
| 30 | 1 |
| 31 | 1 |
| 32 | — |
| 33 | 1 |
| 34 | 1 |
| 35 | — |
| 36 | 1 |
| 37 | — |
| 38 | 1 |
| 39 | 1 |
| 40 | — |
| 41 | 1 |

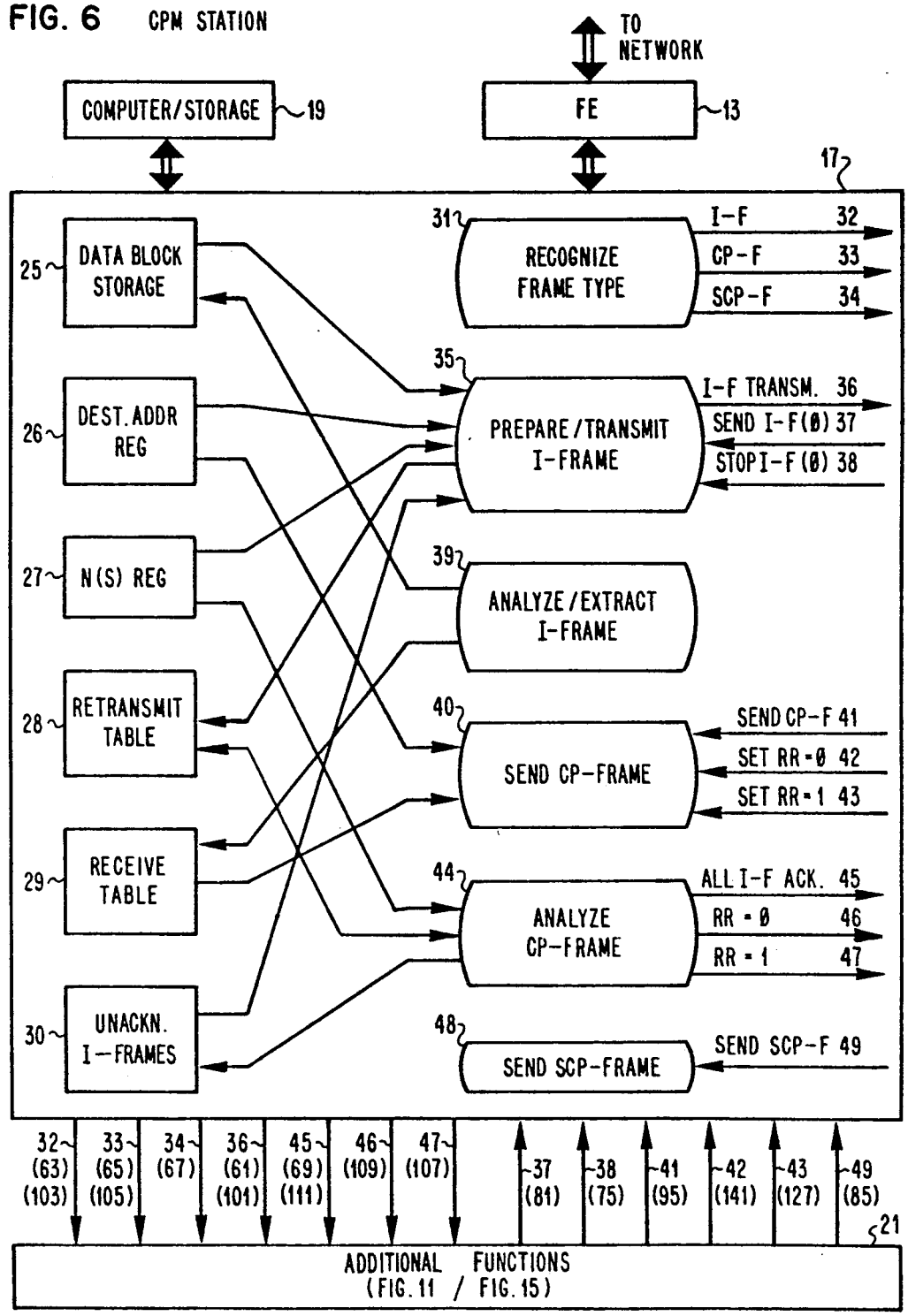
FIG. 6 CPM STATION

FIG. 7 STRUCTURE OF CPM STATIONS
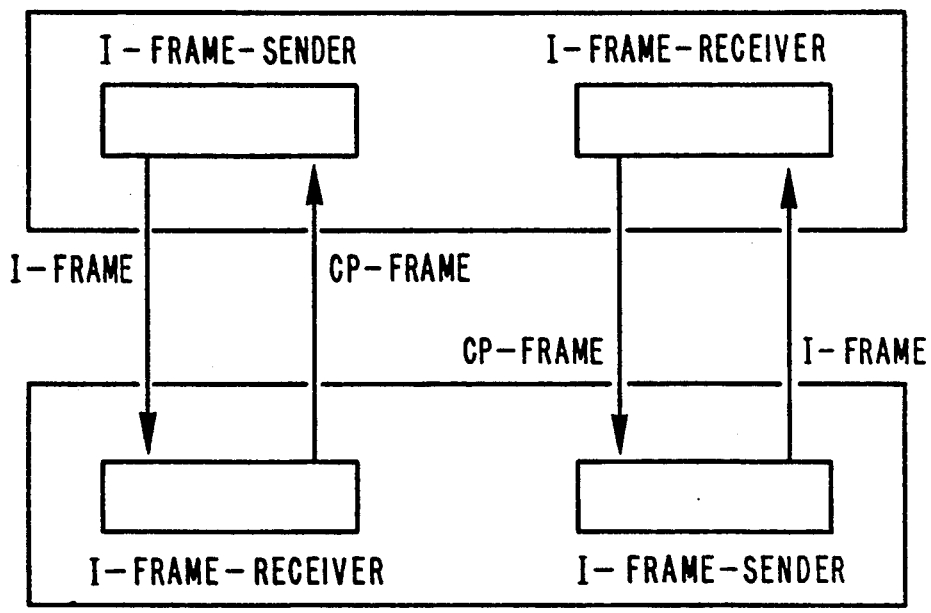
FIG. 8 FLOW OF FRAMES INCLUDING SCP
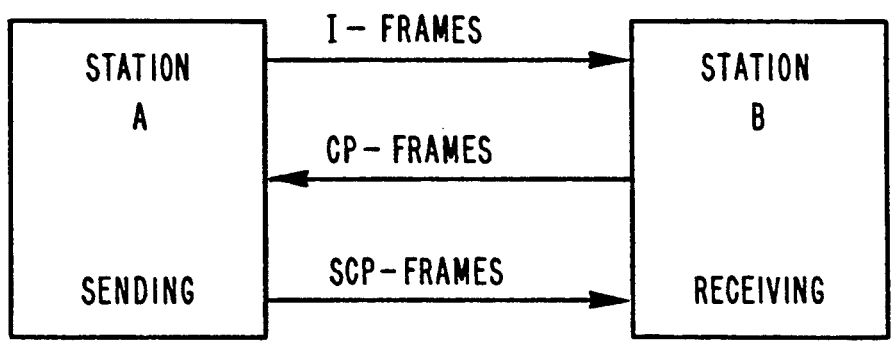

FIG. 9  SCP-FRAME
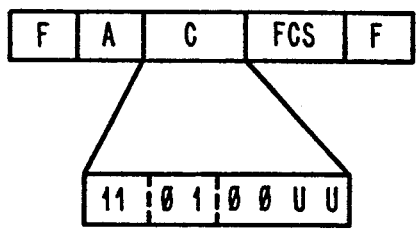
FIG. 10  STATE DIAGRAM FOR I-FRAME-SENDER AND
I-FRAME-RECEIVER PROCESS
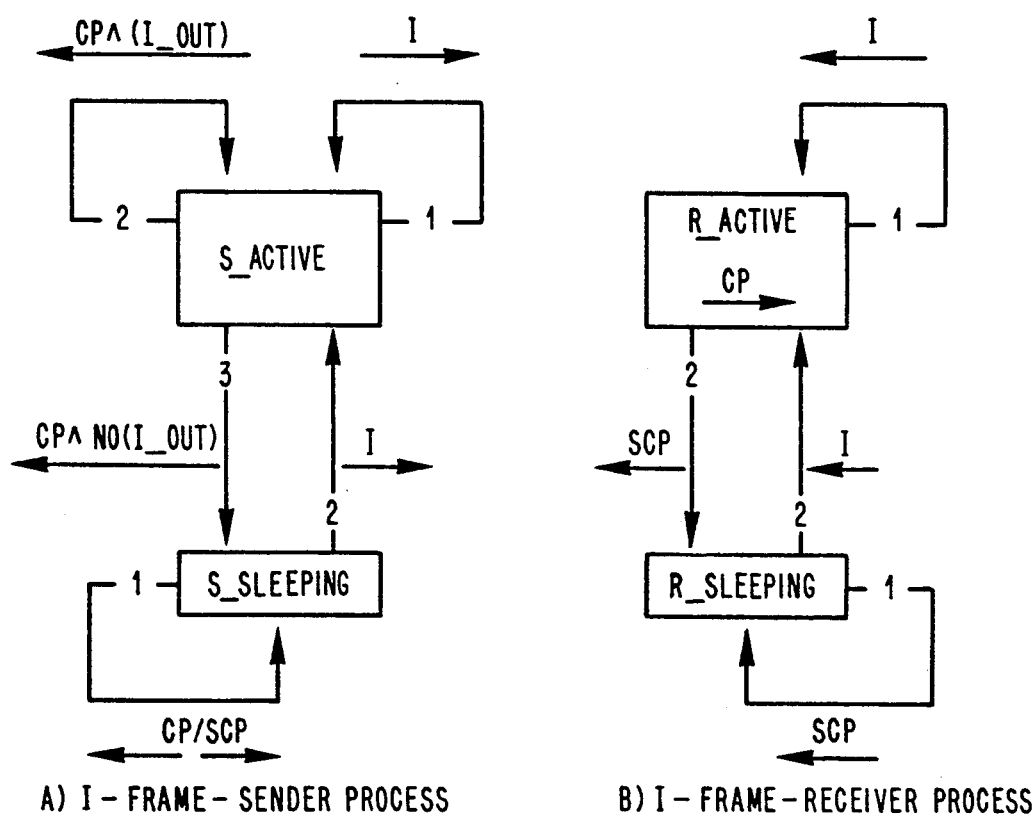
A) I-FRAME-SENDER PROCESS   B) I-FRAME-RECEIVER PROCESS
∧           LOGICAL AND
(I_OUT)     ONE OR MORE I-FRAME OUTSTANDING
NO(I_OUT)   NO I-FRAME OUTSTANDING

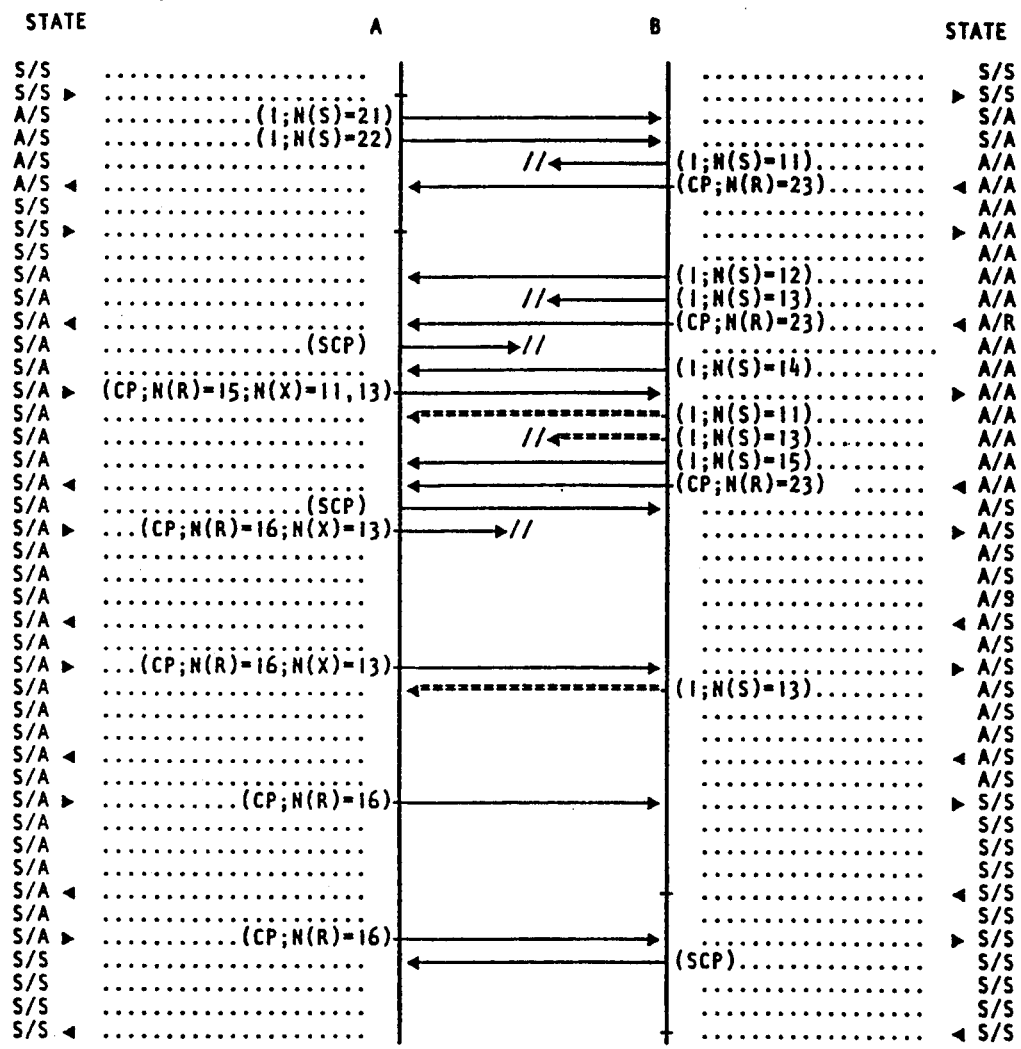

FIG. 13 CP-FRAME INCLUDING RR-BIT
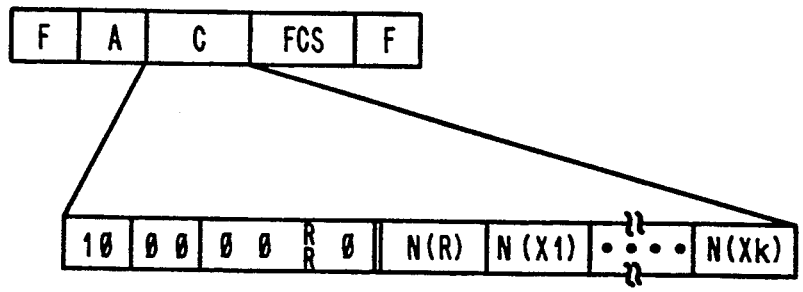
FIG. 14 STATE DIAGRAM OF STATION USING RR-BIT FOR CONTROL FLOW REDUCTION
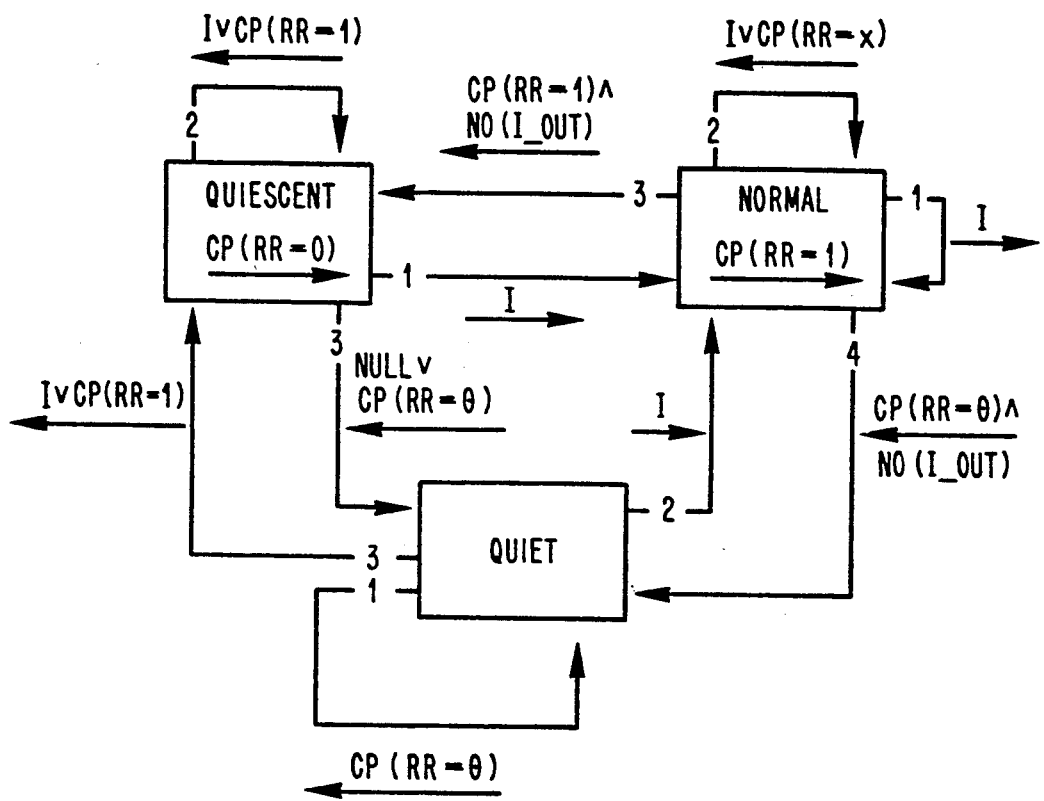
∧          LOGICAL AND
∨          LOGICAL OR
NO (I_OUT)    NO I-FRAME OUTSTANDING

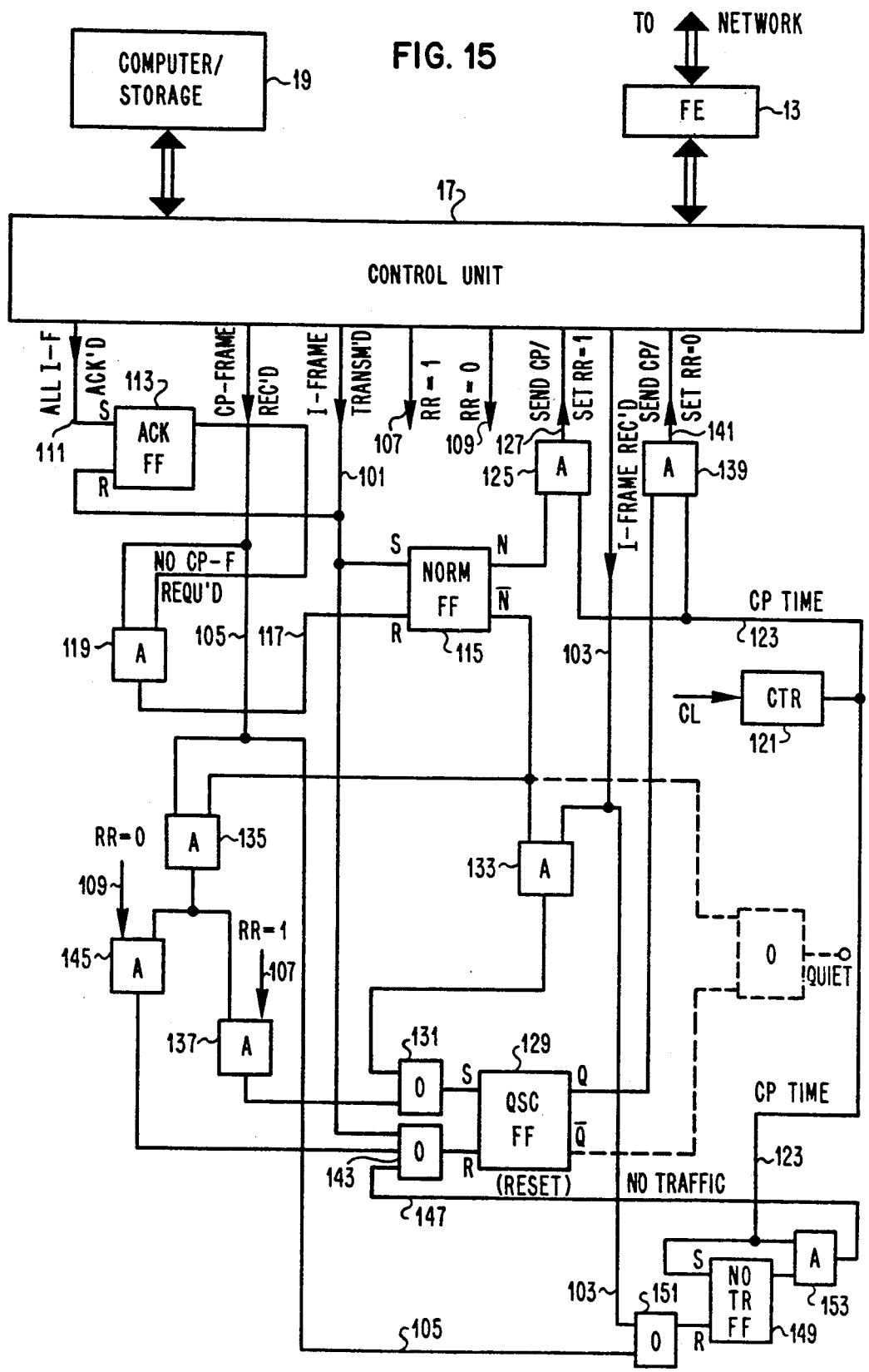

EXAMPLE OF FRAME FLOW WHEN CONTROL FLOW REDUCED BY RR-BITS IN CP-FRAMES

▶ = SEND CP-FRAME FROM A TO B (UNLESS CP STOPPED)
◀ = SEND CP-FRAME FROM B TO A (UNLESS CP STOPPED)
// = FRAME LOST (OR CRC ERROR)
◀----- = RETRANSMISSION

CONTROL FLOW REDUCTION IN SELECTIVE REPEAT PROTOCOLS

DESCRIPTION

1. FIELD OF INVENTION

Present invention is concerned with protocols in a communication system in which data are transferred in frames between partner stations through a transmission network and in which, in case of error, the transmission of frames is selectively repeated. In particular, the invention is concerned with an improvement in such a selective repeat protocol, by which the flow of control information can be reduced.

2. BACKGROUND

The so called "Checkpoint Mode Protocol" was described in U.S. Pat. No. 4,439,859 entitled "Method and System for Retransmitting Incorrectly Received Numbered Frames in a Data Transmission System". In the disclosed system, information frames are used for the transmission of data between two stations. These information frames are consecutively numbered to allow identification of individual frames and to enable checking of the completeness of the frame sequence received.

For acknowledging reception of the latest information frame, and for requesting the retransmission of incorrectly received information frames, so called "Checkpoint Frames" are transmitted at regular intervals from the receiving to the sending station. When, for some time interval, the sending station has no information frames to transmit, and the receiving station has correctly received all previously transmitted information frames, the receiving station nevertheless continues to transmit the checkpoint frames.

It would be desirable to reduce the flow of checkpoint frames during periods where no retransmission of information frames is necessary and no new information frames are transmitted, because during such time intervals the checkpoint frames are all identical and unnecessarily occupy a fraction of the network transmission capacity.

OBJECTS OF THE INVENTION

It is an object of the invention to devise a transmission procedure by which it is possible to reduce the flow of control information in communication systems using a selective repeat protocol.

It is a further object to provide an improvement in the Checkpoint Mode Protocol which allows in particular situations a reduction in the number of checkpoint frames which must be transmitted, without reducing the effectiveness and security of information frame transmission.

Another object is a reduction of the number of checkpoint frames in a communication system using the Checkpoint Mode Protocol, to the necessary minimum, without requiring much additional hardware or operational steps in the stations.

SUMMARY OF THE INVENTION

The invention achieves these objects by transferring additional control information between partner stations indicating when the transmission of checkpoint frames is required and when not, so that such checkpoint frames are only transmitted when necessary and their transmission is ceased as soon as possible.

In one implementation, the additional control information is transferred between the stations in Stop Checkpointing frames. In another implementation, the additional control information is transferred in the checkpoint frames in the form of Request-Reply bits. The transmission of checkpoint frames is ceased when the additional control information indicates that all information frames were correctly received and no more retransmission is required; the transmission of checkpoint frames is resumed when either a new information frame is received, or when the additional control information indicates that checkpoint frames are desired.

Further features and advantages of the invention will become apparent from the following detailed description of preferred embodiments which are disclosed in connection with the accompanying drawings.

LIST OF DRAWINGS

FIG. 4 is an example of a retransmit table as stored in a sending station using the CPM protocol.

FIG. 5 is an example of a receive table as stored in a receiving station using the CPM protocol.

FIG. 6 is a functional block diagram of a station in a system as shown in FIG. 1, which is equipped for operating under the CPM protocol.

FIG. 7 shows the functional structure of a pair of stations using the CPM protocol, which operate both in a sending and in a receiving function.

FIG. 8 schematically illustrates the flow of frames, including Stop Checkpointing frames (SCP-frames), between a sending and a receiving station.

FIG. 9 illustrates the format of the new Stop Checkpointing frames introduced by present invention.

FIG. 10 is a state diagram for the I-frame-sender process and the I-frame-receiver process in a station using SCP-frames for flow control in the CPM protocol.

Figure 11:
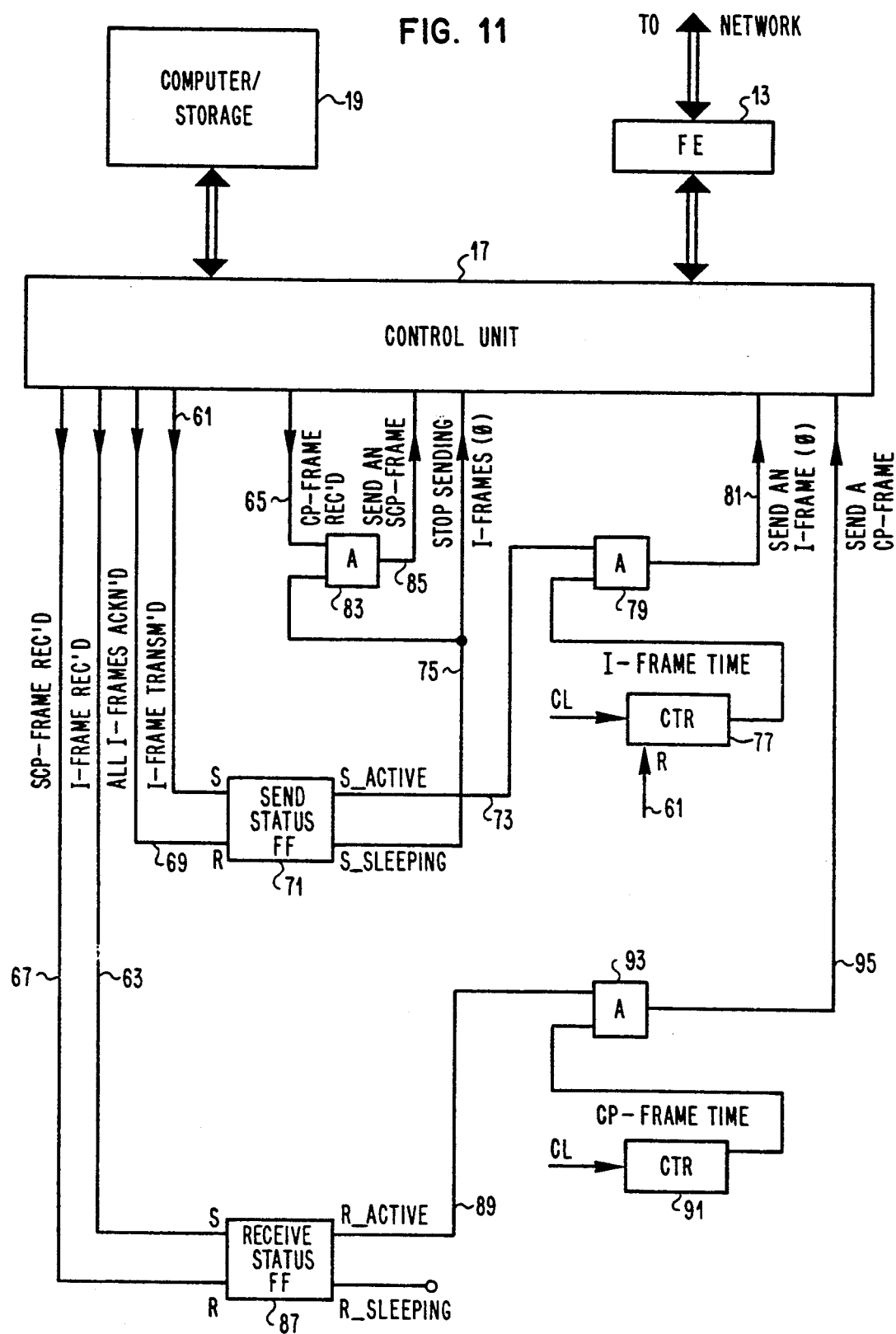

FIG. 11 is a block diagram showing additional logic means provided for the handling of SCP-frames in a CPM station.

FIG. 12 is an example of frame flow between two stations under the CPM protocol when SCP-frames are used for control flow reduction.

Figure 3:
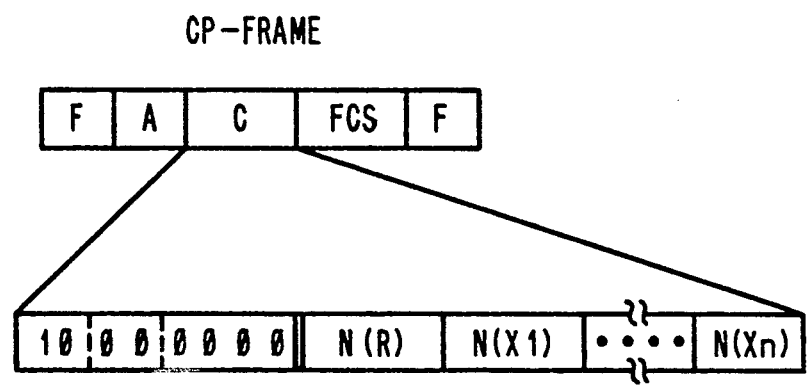
FIG. 3 illustrates the format of the checkpoint frames used in the CPM protocol, in particular the CP-frame control field.

FIG. 13 illustrates a CP-frame format as shown in FIG. 3 with an additional Request-Reply bit (RR-bit) for enabling control flow reduction according to the invention.

FIG. 14 is a state diagram for a station using the CPM protocol with additional RR-bits in CP-frames for flow control reduction.

FIG. 15 is a block diagram showing additional logic means for enabling a reduction of control flow when RR-bits are used in CP-frames.

Figure 16:
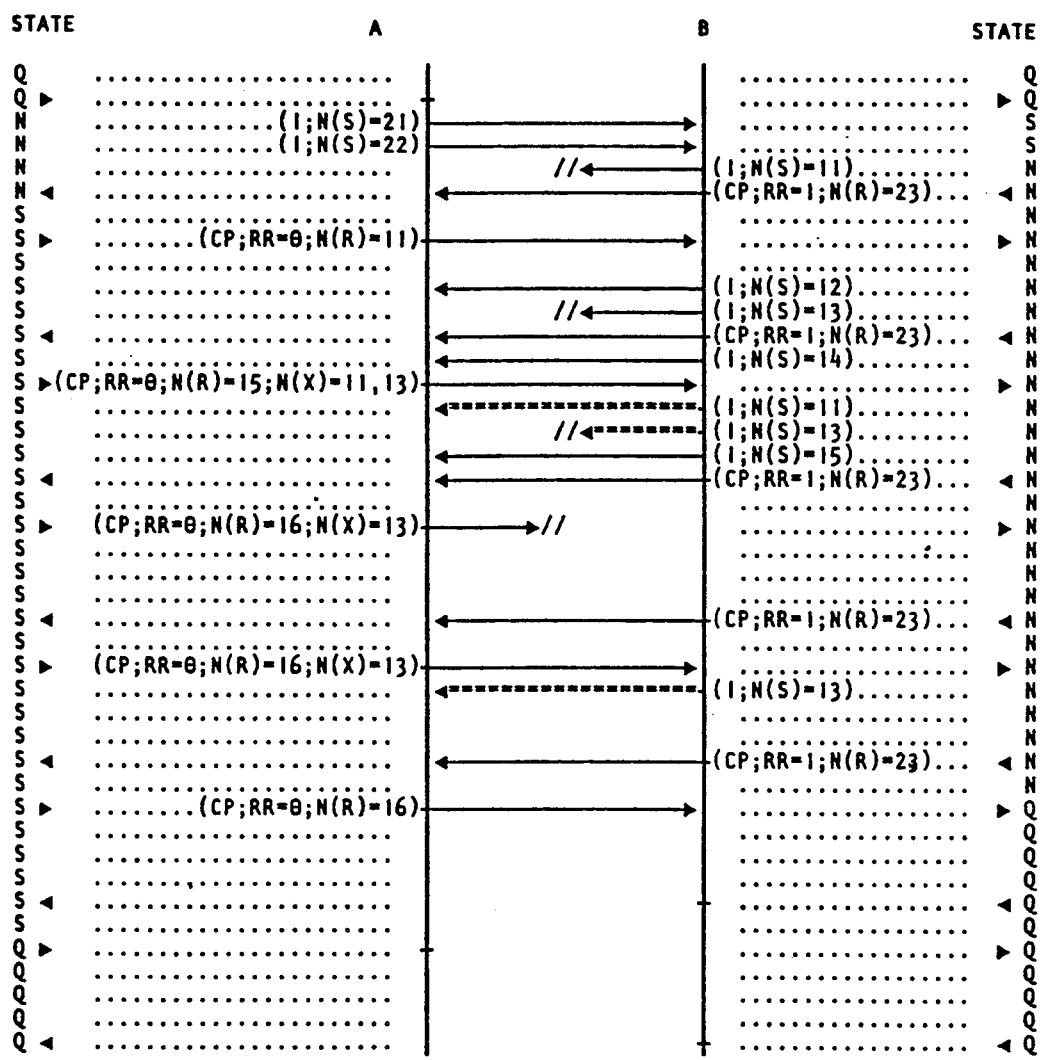

FIG. 16 is an example of frame flow between two stations under the CPM protocol when RR-bits are used in CP-frames for control flow reduction.

DETAILED DESCRIPTION

A) Basic Data Link Protocol with Checkpoints (CPM)

The Checkpoint Mode Protocol (CPM) which is disclosed in detail in U.S. Pat. No. 4,439,859 will be briefly reviewed in the following to enable a better understanding of the invention.

Figure 1:
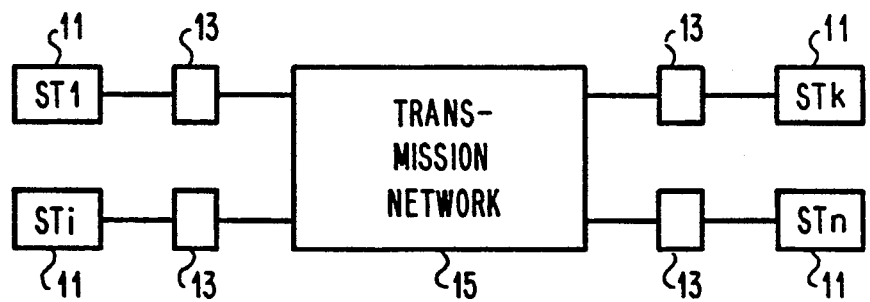
FIG. 1 shows the general form of a system in which present invention is used.

It is assumed that the system in which the invention will be used is of the structure as shown in FIG. 1. A plurality of stations 11 is connected, each via a frontend unit 13, to a transmission etwork 15. The network may be a ring, a star network, a meshed network or any other type. For transmission of information, a session is established between two stations of which one will be the sending and the other the receiving station. Of course, duplex sessions are also possible in which each station has a sending station function and a receiving station function.

The basic frame format for transmitting information over the network between stations is $$F-A-C-INFO-FCS-F$$

where F = frame delimiter (one begin and one end delimiter), A = source and destination address, C = control field, INFO = information to be transmitted, FCS = frame check sequence (e.g. CRC). In general, three different frame types are provided: Information frames, Supervisory frames, and Unnumbered frames.

Figure 2:
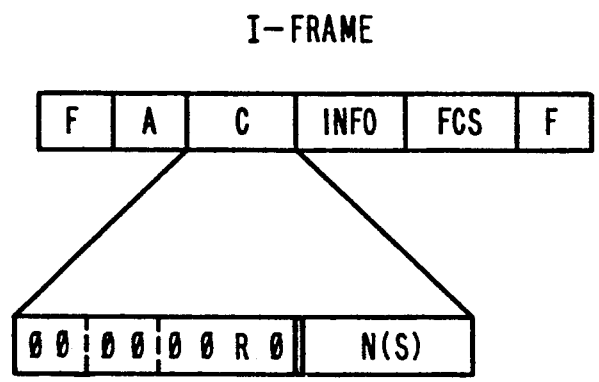
FIG. 2 illustrates the format of the information frames used in the CPM protocol, in particular the I-frame control field.

In the CPM, two kinds of frames are used which are illustrated in FIG. 2 and FIG. 3, respectively. The information frame or I-frame (FIG. 2) has an information field INFO and serves for actually carrying data. The checkpoint frame or CP-frame (FIG. 3) is a supervisory frame in which the information field is omitted; it serves for checking/controlling the flow of information frames. I-frames go from a sending station to a receiving station, and CP-frames travel in the opposite direction. All I-frames leaving a station and carrying the same destination address are consecutively numbered by a send sequence number N(S) carried in the control field of the I-frame, cf. FIG. 2. The first bit of the control field is zero and indicates that the respective frame is an I-frame. The seventh bit of the control field is an R-bit which indicates whether the respective I-frame is retransmitted (R = 1).

The sending station keeps a table of send sequence numbers N(S) of recently transmitted I-frames (Retransmit Table, FIG. 4) in which it can also enter a variable V(T) for indicating before which new (non-retransmitted) I-frame the respective older I-frame was last transmitted. Thus, for all I-frames which were not yet retransmitted the variable V(T), also termed "retransmission order indicator" in the following, is N(S)+1; for I-frames which were retransmitted, V(T) has a higher value as indicated in FIG. 4. For all previously transmitted I-frames which are finally acknowledged (as will be explained later) the respective entries in the Retransmit Table are eliminated.

The receiving station keeps (for each sending station with which it is has a session) a table of send sequence numbers N(S) of expected I-frames, the Receive Table (cf. FIG. 5). In a column RCV of this table, the receiving station marks each correctly received I-frame.

For those send sequence numbers which are contained in the Receive Table and are not yet marked in the RCV column (but for which a higher send sequence number with a RCV mark exists), the receiving station request a retransmission from the sending station.

Acknowledgement of correctly received I-frames and request for retransmission of missing I-frames occurs as follows: A receiving station transmits a checkpoint frame (CP-frame) to a sending station with which it has a session when a given time interval has elapsed since the last transmission of a CP-frame (or when a missing frame is detected in the Receive Table).

The first byte of the CP-frame control field contains as first and second bits the combination "10" which indentifies this as a CP-frame. Each CP-frame contains in its control field sequence number N(R) whose value is one greater than the value of the send sequence number N(S) of the highest-numbered correctly received, non-retransmitted I-frame; thus, the receive sequence number is equal to the send sequence number of the next new (non-retransmitted) I-frame that is expected by the receiving station.

In addition, the CP-frame can contain (also in its control field) a plurality of "retransmission request identifier" numbers N(X) for requesting retransmission of missing I-frames. Each N(X) number corresponds to the send sequence number N(S) of a missing (or incorrectly received) I-frame which is listed in the Receive Table without an RCV mark, and there can be as many N(X) numbers as are necessary (variable length of CP-frames). The N(X) numbers appear in the CP-frame in ascending order.

In the sending station, a received CP-frame is stored, and the station retransmits all requested I-frames whose retransmission order indicator V(T) is less than the receive sequence number N(R) of the respective CP-frame. This procedure avoids multiple retransmission of I-frames which were only recently retransmitted, i.e. after a new I-frame which has even not yet arrived at the receiving station (and whose send sequence number was entered as retransmission order indicator V(T) in the Retransmit Table for those I-frames).

When an I-frame is retransmitted, its retransmission order indicator V(T) is updated, by entering the sequence number which is to be used by the next new (non-retransmitted) I-frame. Each entry in the Retransmit Table which has a sequence number N(S) whose value is less than the receive sequence number N(R) of the stored received CP-frame, and which is not contained as retransmission request identifier N(X) in the stored received CP-frame, is deleted, because the respective I-frame is considered as finally acknowledged.

FIG. 6 is a schematic representation of a station using the CPM protocol. The station has a control unit 17 which is connected through a front-end unit 13 to the transmission network, and the control unit is connected to a computer or at least to a storage unit 19. Additional features for implementing present invention are indicated as block 21 and will be described in more detail with reference to FIGS. 11 and 15.

Functions and operation of the basic station essentially correspond to those of the station described in the prior art (U.S. Pat. No. 4,439,859). In control unit 17 of FIG. 6, only a few components and functions are shown which are of interest for present invention.

The control unit comprises data block storage 25 for holding a block of data to be transmitted or received by an I-frame; destination address register 26 holding the address of the present partner station; an N(S) register 27 holding the send number of the I-frame which is to be transmitted next; a retransmit table 28 (as shown in FIG. 4) indicating which I-frames were retransmitted; a receive table 29 (as shown in FIG. 5) indicating which I-frames were correctly received; and storage block 30 holding those I-frames which were recently transmitted but are not yet acknowledged. If a station simultaneously has independent sessions with several partner stations, one set of storage blocks/registers as described above must be provided for each session (or if only a single set is available, contents have to be reloaded for each session transaction).

Following functions are of interest: Recognize Frame Type (31) resulting in an indication whether an I-frame (32) or a CP-frame (33) was received. An additional "SCP" indication (34) will be provided when SCP-frames are used.

When an I-frame is to be transmitted (35), data, destination address, and send number N(S) are taken from storage/registers 25, 26, 27, respectively (or an unacknowledged I-frame is taken from storage block 30 for retransmission). When the I-frame is actually transmitted, a respective indication is furnished (36). When the I-frame was retransmitted, the respective retransmission order indicator V(T) is updated in the retransmit table (28). Additionally, the transmission of empty (zero-length) I-frames can be requested (37) or stopped (38).

When an I-frame was received, its contents is analyzed and the data extracted (39); correct reception of the I-frame is indicated in the receive table (29) by an RCV mark for the respective N(S) entry.

When a CP-frame is to be transmitted (40) this will be requested by a respective signal (41). If additional RR-bits are used, respective CP-frame requests (RR=0, line 42; or RR=1, line 43) have to be given.

When a CP-frame is received, its contents is analyzed (44). In cooperation with the N(S) register (27) and the retransmit table (28), it will be determined whether all outstanding I-frames were received, and if this is the case, a respective indication (45) will be given. The retransmit table (28) will be updated. Also, an indication is given to the storage block (30) holding the unacknowledged I-frames, for deleting those I-frames which were acknowledged by the respective CP-frame. If an additional RR-bit is used in CP-frames, the value of it will be determined and indicated (RR=0, line 46; or RR=1, line 47).

If additional SCP-frames are used in the system, a respective function (48) for preparing and sending an SCP-frame must be provided; the request for transmission of an SCP-frame will be separately given (49).

The indicator and control signals mentioned above will be transferred between the basic control unit functions (17) and additional means (21) as is indicated by respective lines (32, 33, 34, 36, 37, 38, 41, 42, 43, 45, 46, 47, 49) in FIG. 6. In parentheses are shown the reference numbers which are used in FIGS. 11 and 15, respectively, for these signal transfer lines.

B) Disadvantages of Prior Art

In the Checkpoint Mode protocol (CPM) described above, there is no mechanism to recover lost CP-frames (due to transmission error); it is for this reason that such frames are transmitted at regular intervals to ensure that control information eventually reaches the destination. Because of this, it may well happen that many consecutively transmitted CP-frames carry identical information. While this is a desirable property of the protocol to insure integrity of the control flow, one may think of providing enhancements to stop CP-frame transmission if the information they contain is already known to the receiver. As an example, consider the case that there is not outstanding I-frames over a link. Obviously in this case there is no N(X) value carried by CP-frames (all I-frames are already acknowledged). In addition, the value of N(R) in all consecutive CP-frames are the same, therefore, all CP-frames are identical.

C) Principles of and Reasons for Invention

The reduction of CP-frame traffic is very important when the checkpoint interval is short and either a single processor supports multiple links or multiple instances of CPM protocols are active over the same physical link. An important example is the edge-to-edge case where a multiplicity of edge-to-edge connections are usually multiplexed on a single physical link. Short checkpoint intervals are desirable to achieve smaller delays and to reduce buffer requirements. Apparently, if on each of the n connections CP-frames are being sent at a rate of k frames per second, the link will have to carry n×k CP-frames per second. Due to the burstiness of the data traffic, only a certain fraction of the connections will be simultaneously active. By avoiding transmission of CP-frames on momentarily inactive connections, a substantial saving in CP-frame transmissions can be expected.

A further advantage is that in case the protocol is employed over a switched line, it is possible to temporarily disconnect the line if no traffic is flowing without terminating the data link control connection. The original protocol would not permit this, since it requires a continuous flow of CP-frames.

By present invention there are proposed two mechanisms for the purpose of stopping the flow of CP-frame traffic when all I-frames have been acknowledged. The first mechanism requires introduction of a special Unnumbered frame, the Stop Checkpointing frame. The second mechanism requires only the additional use of a 1-bit field in CP-frames referred to as the Request-Reply bit (RR-bit).

D) CP-Frame Reduction by a Special Frame

The first embodiment of the invention requires an additional special (Unnumbered) frame, but allows to stop the flow of CP-frames, even if there is still I-frame traffic in one direction. The virtue of this protocol is better appreciated by focussing on some basic properties regarding the structure of a CPM station.

A CPM station can be viewed to contain two independent processes, an I-frame-sender process and I-frame-receiver process. The I-frame-sender process is responsible to send out I-frames to, and receive CP-frames from, the remote CPM station. The I-frame-receiver process, on the other hand, is responsible to receive I-frames from, and send CP-frames to, the remote station. Within a station, the two processes are, in principle, totally independent of each other as illustrated in FIG. 7. This property can be exploited to reduce the control flow traffic. The explanation below is focussed on the operations of these two processes separately.

1) Principles/Basic Features

This first embodiment makes use of a special frame, referred to as the Stop Checkpointing (SCP) frame. This is an unnumbered framed and is sent out by the I-frame-sender process and received by the I-frame-receiver process. The situation is illustrated in FIG. 8.

The structure of the SCP-frame is shown in FIG. 9. Its control field comprises only one byte, identifying it as an SCP-frame.

The I-frame-sender process has two states, active and sleeping; denoted by S_ACTIVE and S_SLEEPING, respectively. The I-frame-sender process operates according to the following rules:

In normal operation, the process is in S_ACTIVE state; it sends out I-frames (including zero-length I-frames) and receives CP-frames. When all non-zero-length I-frames are acknowledged, it goes from S_ACTIVE state to S_SLEEPING state.

While in S_SLEEPING state, it no longer sends out zero-length I-frames. However, it will reply to each CP-frame it receives with a special Stop Checkpointing (SCP) frame. Note that the SCP-frame is different from CP-frames and is received by the I-frame-receiver process.

When in S_SLEEPING state, if an I-frame is sent out, the process goes to S_ACTIVE state.

Similarly, the I-frame-receiver process has two states R_ACTIVE and R_SLEEPING. The operation is as follows:

The I-frame-receiver process normally operates in R_ACTIVE state in which it sends out CP-frames at CP intervals and receives I-frames.

When the I-frame-receiver process receives an SCP-frame, it goes to R_SLEEPING state and stops sending CP-frames.

While in R_SLEEPING state, all received SCP-frames are ignored. On the other hand, if an I-frame is received, the process goes to the R_ACTIVE state.

FIG. 10 (A and B) shows the automata for these two processes. FIG. 10A is for the I-frame-sender and FIG. 10B is for the I-frame-receiver process. In this figure, the frames sent out are denoted by→, and the ones received are indicated by ←. Note that the I-frame-receiver process is responsible for sending out CP-frames and it only does so while in state R_ACTIVE (denoted by "CP→" in state R_ACTIVE). The following explains the operation of each automation in more detail.

I-frame-sender process:

This process is responsible for sending out I-frames and SCP-frames and receiving CP-frames. The automaton is shown in FIG. 10A.

S_ACTIVE: This is the state when one or more non-empty (non-zero-length) I-frames are outstanding. The actions taken are (numbers correspond to arrows in FIG. 10):

1. Upon sending an I-frame (real or empty), the I-frame-sender process stays in the same state.
2. Upon reception of a CP-frame the I-frame-sender process stays in the same state, unless the CP-frame acknowledges all outstanding non-zero-length I-frames, see the next step below.
3. When a CP-frame is received which acknowledges all not yet acknowledged, non-zero-length I-frames, the process transits to S_SLEEPING state.

S_SLEEPING: This is the state in which the I-frame-sender process no longer sends any I-frames (including zero-length ones), but reacts to reception of a CP-frame. The actions taken are:

1. For each CP-frame received, the process sends an SCP-frame (this is indicated by "←CP/SCP→") and stays in the same state.
2. When an I-frame is sent out, the process goes to S_ACTIVE state.

I-frame-receiver process:

This process is responsible for receiving I-frames and SCP-frames and sending out CP-frames. The automaton is shown in FIG. 10B.

R_ACTIVE: In this state the process sends out a CP-frame at CP intervals. The actions taken when a frame is received are:

1. The process continues receiving I-frames and stays in the same state.
2. When an SCP-frame is received, the process transfers to R_SLEEPING state.

R_SLEEPING: In this state no CP-frame is transmitted. The state transitions are:

1. When SCP-frames are received, the process stays in the same state.
2. When an I-frame is received the process transfers to R_ACTIVE state.

2) Arrangement for CP Flow Control by Additional SCP-frames

In FIG. 11, an arrangement for controlling the flow of CP-frames by an additional SCP-frame is shown in a block diagram.

Functions of the control unit 17 were generally described above with reference to FIG. 6. It can generate, transmit, receive, and analyze I-frames and CP-frames, including generation and detection of SCP-frames. The control unit will furnish the following control signals on respective lines: I-frame Transmitted (61), I-frame Received (63), CP-frame Received (65), SCP-frame Received (67), All I-frames Acknowledged (69).

A Send Status Latch (71) is set by the signal on line 61 when an I-frame is transmitted from the respective station, and is reset by the signal on line 69 if no more I-frames are unacknowledged (which is the case when a CP-frame with no retransmission request for a non-zero I-frame is received and the locally stored N(S) for the next I-frame is equal to the N(R) received in the CP-frame). The true output signal of this latch, S_ACTIVE on line 73, indicates whether the I-frame-sender function is active so that I-frames with zero contents should be transmitted at regular intervals (unless normal I-frames are transmitted). The complementary output signal of this latch, S_SLEEPING on line 75, indicates when the I-frame-sender status is quiet and the respective station should not send any (empty) I-frames; this signal is furnished as control signal to the control unit.

For causing generation and transmission of empty I-frames at regular intervals, counter 77 is provided which receives a cycle clock on its input and furnishes a signal "I-frame Time" at given intervals. When the signal S_ACTIVE on line 73 is up, the I-frame time signal is furnished through AND gate 79 on line 81 to the control unit, to cause transmission of an empty I-frame. If a normal (information carrying) I-frame is transmitted by the station, the signal on line 61 resets the counter to restart the I-frame time interval.

The signal S_SLEEPING on line 75 is also furnished to AND gate 83 which transfers the signal CP-frame Received of line 65 as control signal "Send an SCP-frame" on line 85 to the control unit.

A Receive Status Latch (87) is set by the signal on line 63 when an I-frame is received, and it is reset when an SCP-frame is received, by the signal on line 67. The true output signal of this latch, R_ACTIVE on line 89, indicates when an I-frame was received by the I-framereceiver section of the station so that this section should send out CP-frames for acknowledging I-frames or requesting retransmission of I-frames from the remote station.

A counter 91, receiving a cycle clock signal, furnishes at regular intervals a control pulse "CP-frame Time". This pulse is furnished through AND gate 93, when the signal on line 89 is up, as control signal "Send a CP-frame" on line 95 to the control unit. When an SCP-frame is received by the station, latch 87 will be reset and no more CP-frames are transmitted.

3) Example

FIG. 12 shows an example of this protocol in operation. States of a station are shown by symbol x/y, where x is the state of the I-frame-sender process and y is that of the I-frame-receiver process. x and y can be S or A to indicate SLEEPING or ACTIVE state, respectively. Both stations are in SLEEPING state (both for I-frame-sender and I-frame-receiver processes) at the beginning and the N(S) values of stations A and B are 21 and 11, respectively.

The example of FIG. 12 is self-explanatory. The arrowheads shown at the extreme left and right sides of this figure indicate when a CP-frame is due in the one or the other direction. It can be seen that CP-frames are only transmitted when it is actually necessary.

Some remarks:
1. Provisions are made to stop sending empty (zero-length) I-frames in case of no traffic, when all real I-frames are acknowledged (i.e. in S_SLEEPING state).
2. If CP intervals are provided by a programmed interval timer, the CP interval timer can be turned off when the I-frame-receiver process is in R_S-LEEPING state, to avoid overhead due to interrupt handling.

E) Control Flow Reduction Using a Request-Reply Bit in CP-Frames

In the second embodiment, the flow of CP-frame traffic is stopped in both directions when both stations have received acknowledgements for all their I-frames and neither side has new I-frames to transmit (note however that the link is not deactivated). Basically when a station recognizes that all the I-frames it has sent are already acknowledged, it informs the other that it is no longer necessary that CP-frames be sent to it. When both stations are informed of this fact, they will stop transmitting CP-frames.

1) Principles I Basic Features

CP-frames will use an additional control bit, referred to as the Request-Reply bit (RR-bit), which is the seventh bit of the control field and which is set (to 1) whenever the station has transmitted an I-frame that is not yet acknowledged. Such a CP-frame is schematically shown in FIG. 13.

A station executes one of the following steps for transmission of its CP-frames each time a checkpoint interval expires:

Transmit a CP-frame with the Request-Reply bit set, if at least one transmitted I-frame has not yet been acknowledged.

Transmit a CP-frame with the Request-Reply bit not set, if all transmitted I-frames are acknowledged and during the last checkpoint interval an I-frame or a CP-frame with the Request-Reply bit set has been received.

In all other cases do not transmit a CP-frame.

FIG. 14 shows the automation for this protocol which governs operations in a CPM station. There are three states, NORMAL, QUIESCENT, and QUIET. In this figure the frames (I-frames and/or CP-frames) which the station sends out are denoted by→, and the ones the station receives are denoted by ←. Within each state box, the figure shows the action taken when the CP time interval expires. For example, in NORMAL state, when the CP time interval expires a CP-frame with Request-Reply bit set to 1 is sent out. This situation is denoted in the figure by "CP(RR=1)→". Now the operations of this automaton are explained in more detail.

NORMAL: In NORMAL state the station has one or more unacknowledged I-frames. At CP time intervals the station sends a CP-frame with Request-Reply bit set to 1. The actions taken when a frame is received and/or transmitted are (numbers correspond to arrows in the figure):

1. The station continues sending out I-frames and stays in NORMAL state.
2. The station continues receiving I-frames and/or CP-frames and stays in the same state. CP(RR=x) indicates that the Request-Reply bit on the CP-frames can be 1 or 0.
3. The station leaves NORMAL state when it receives a CP-frame and it has no more unacknowledged I-frames. If this CP-frame has Request-Reply bit set to 1, denoted by "←CP(RR=1)", it goes to state QUIESCENT.
4. On the other hand if the previous condition holds and the RR-bit of the CP-frame is not set to 1 then the station transits to QUIET state.

Note: If during a CP interval no CP-frame is received, the station stays in NORMAL state.

QUIESCENT: In this state, the station does not have any outstanding I-frame and it does not need to receive any CP-frame; however, the other station does have outstanding I-frames. The station continues sending CP-frames (at CP intervals, of course), however, the RR-bit is set to 0. The actions taken when a frame is received and/or transmitted are:

1. If an I-frame is sent out, then the station goes to NORMAL state (indicated in the figure by "I→").
2. The station continues receiving I-frames and CP-frames with RR-bit set to 1 and stays in the same state.
3. If a CP-frame with RR-bit set to 0 is received, which is indicated by "←CP(RR=0)", the station goes to QUIET state. This indicates that the other station has no more unacknowledged I-frames and does not need to receive more CP-frames.

Equivalently, if the station does not receive anything during a full CP interval (indicated by "←NULL"), then it assumes the other station does not need any more CP-frame and goes to QUIET state.

Note: For implementation purposes, it is recommended that if during the last N (N≧2) CP intervals nothing is received then transition takes effect.

QUIET: When in this state, neither station has any unacknowledged I-frames and there is no need for CP-frames. Under such condition, both stations should reach this state (with a minor transient period). The actions taken when a frame is received and/or transmitted are (note that no CP-frame is sent out):

1. If a CP(RR=0) is received, the station stays in QUIET state. This condition happens when QUIET state was reached from QUIESCENT state and the other station momentarily continues sending such frames.
2. If an I-frame is sent out, then the station goes to NORMAL state (to request receiving CP-frames).
3. If a CP(RR=1) and/or an I-frame is received, then the station goes into QUIESCENT state.

2) Arrangement for CP Flow Control by RR-Bits

In FIG. 15, an arrangement for controlling the flow of CP-frames by an additional RR-bit in each CP-frame (cf. FIG. 13) is shown in a block diagram.

Functions of the control unit 17 were generally described above with reference to FIG. 6. It can generate, transmit, receive, and analyze I-frames and CP-frames, including setting and detection of the RR-bit (seventh bit) in the control field of CP-frames. The control unit will furnish the following control signals on respective lines: I-frame Transmitted (101), I-frame Received (103), CP-frame Received (105), RR=1 (RR-bit in just received CP-frame was set to one) (107), RR=0 (109), All I-frames Acknowledged (111).

An Acknowledge Latch (113) is set by the signal on line 111 if no more I-frames are unacknowledged, and is reset by the signal on line 101 when an I-frame is transmitted from the respective station. The true output signal of this latch indicates (when up) that the station is in a state where it does not require further CP-frames from the remote station.

A Normal Latch (115) is set by the signal on line 101 when an I-frame is transmitted; it is reset when any CP-frame is received after all I-frames were acknowledged, in response to the output signal (line 117) of AND gate 119 which combines the output signal of latch 113 and the signal on line 105. The true output signal N of latch 115 indicates that the station is in NORMAL state. In this state, CP-frames must be transmitted at regular intervals with the RR-bit set to 1 (requesting CP-frames also from the remote station).

A counter 121 receiving a cycle clock on its input, furnishes a control signal "CP Time" on its output line 123 at regular intervals. AND gate 125 combines this signal and the N signal from latch 115, and furnishes the signal "Send CP/Set RR=1" on line 127 to the control unit.

A Quiescent Latch (129) is provided for the status when the station has no outstanding I-frames and does not want to receive CP-frames, but must transmit CP-frames to the remote station. This latch will be set, through OR gate 131, either when an I-frame is received during a quiet state (signal on line 103 gated by AND gate 133 when complementary output $\bar{N}$ of the Normal latch is up), or when a CP-frame with RR-bit set to 1 is received during that state (signal on line 105 gated by AND gate 135 when complementary output $\bar{N}$ of the Normal latch is up, and then combined with signal RR=1 on line 107 in AND gate 137).

The true output signal Q of latch 129 is combined in AND gate 139 with the regular CP Time signal on line 123, to form on line 141 another control signal "SEND CP/SET RR=0" for the control unit, to cause regular transmission of CP-frames with RR bits set to 0 during the quiescent state. The Quiescent Latch 129 is reset through OR gate 143 under each one of three conditions: When an I-frame is transmitted (signal on line 101), when a CP-frame with RR=0 is received during quiet state (signal on line 105 gated by AND gate 135 when Normal Latch 115 is off, then combined with signal RR=0 on line 109 in AND gate 145), and when a signal "No Traffic" appears on line 147, indicating that neither an I-frame nor a CP-frame were received during the last CP time interval. The No Traffic signal is developed as follows: A latch 149 is set by the signal on line 123 each time when a CP interval starts. It will be reset, through OR gate 151, when the signal on line 103 or line 105 indicates that an I-frame or a CP-frame, respectively, was received. If latch 149 is not reset during the CP interval, then the next CP Time pulse on line 123 will be gated through AND gate 153 to reset line 147.

The actual QUIET status mentioned above is present when neither the NORMAL Latch 115 nor the QUIESCENT Latch 129 are set (as is indicated by dotted lines in FIG. 15).

3) Example

FIG. 16 illustrates an example of this protocol in operation. This figure shows the states of both stations; NORMAL, QUIESCENT and QUIET states are represented by N, S and Q, respectively. It is assumed that both stations are in QUIET state at the beginning and that the N(S) values in stations A and B are 21 and 11, respectively.

The example of FIG. 16 is self-explanatory. The arrowheads shown at the extreme left and right sides of this figure indicate when a CP-frame is due in the one or the other direction. It can be seen that CP-frames are only transmitted when it is actually necessary.

Some remarks:
- In the CPM protocol, when there is no traffic, stations transmit zero-length I-frames to preserve integrity of the protocol. In this case provisions should be made to stop transmission of empty (zero-length) I-frames when there is no real I-frame outstanding. In an article "Selective Repeat Protocol for Communication Systems", IBM Technical Disclosure Bulletin, Vol. 30, No. 4, September 1987, pp. 1451/1452, a selective repeat data link protocol has been proposed in which there is no need for zero-length I-frames. If such a protocol is used, no modification is needed.
- It is possible to implement CP-frame timing by a programmed checkpoint interval timer, and to stop this timer when a station ceases transmission of CP-frames. Stopping the checkpoint interval timer is advantageous because this reduces the overhead due to handling of the timer interrupt, when it is not being used. To realize this feature the following additional steps need to be taken:
    - Upon expiration of the checkpoint interval timer stop this timer if all transmitted I-frames are acknowledged and during the last checkpoint interval no CP-frame has been received.
        - Note: For implementation purposes, it is recommended that the timer is only stopped if during the last N (N≧2) CP intervals nothing is received.
    - When an I-frame or a CP-frame with the Request-Reply bit set to 1 is received and the checkpoint interval timer is not running, then start the checkpoint interval timer.

We claim:

1. In a communication system for transmitting data between stations connected to a transmission network, using information frames sent from a sending station to a receiving station and checkpoint frames sent from the receiving station to the sending station, each information frame carrying a send sequence number, and each checkpoint frame carrying a receive sequence number identical to the send sequence number of the next expected new information frame thus acknowledging the highest-numbered correctly received information frame, plus the send sequence number of each information frame missing in the sequence of correctly received information frames for requesting retransmission of each said missing information frame, in which system said checkpoint frames are transmitted from a receiving station to a sending station at regular intervals, a method for reducing the number of checkpoint frames, comprising following steps:

transmitting from a sending station a particular unnumbered frame to the receiving station as Stop Checkpointing frame (SCP-frame), if in said sending station a) there is no request for transmitting data in a new information frame, and b) a checkpoint frame is received from the receiving station comprising no sequence numbers of missing information frames and comprising a receive sequence number which acknowledges the latest new information frame transmitted from said sending station;

stopping the transmission of checkpoint frames at regular intervals from a receiving station, if said receiving station a) has received all arrived information frames correctly and no information frame is missing in the sequence so that no request for retransmission is necessary, and b) receives a Stop Checkpointing frame (SCP-frame) from the sending station; and resuming the transmission of checkpoint frames at regular intervals from the receiving station if it receives any new information frame from the sending station.

2. Method in accordance with claim 1, for additionally reducing the flow of information frames in a system in which empty information frames are transmitted also at regular intervals from a sending station if no data for transmission are available;

comprising the additional step of stopping the transmission of empty information frames at regular intervals when an SCP-frame is transmitted, and resuming said transmission of empty information frames at regular intervals when a new non-empty information frame was transmitted.

3. In a communication system for transmitting data between stations connected to a transmission network, using information frames sent from a sending station to a receiving station and checkpoint frames sent from the receiving station to the sending station, each information frame carrying a send sequence number, and each checkpoint frame carrying a receive sequence number identical to the send sequence number of the next expected new information frame thus acknowledging the highest-numbered correctly received information frame, plus the send sequence number of each information frame missing in the sequence of correctly received information frames for requesting retransmission of each said missing information frame, in which system said checkpoint frames are transmitted from a receiving station to a sending station at regular intervals indicated by a checkpoint signal, and in which system a pair of stations can exchange data in both directions over said network, each of the two stations operating simultaneously as sending station for one direction and as receiving station for the other direction, a method for reducing the number of checkpoint frames, comprising following steps:

generating each of said checkpoint frames to include a field for a request-reply bit (RR-bit);

transmitting from a station, when the checkpoint signal occurs, a checkpoint frame with the RR-bit set if at least one information frame it has transmitted has not yet been acknowledged by the contents of a checkpoint frame from the other station;

transmitting from a station, when the checkpoint signal occurs, a checkpoint frame with the RR-bit not set if all information frames it has transmitted were acknowledged by the contents of checkpoint frames from the other station, and if it received, during the last previous checkpoint signal interval, or during a preselected number of previous consecutive checkpoint intervals, from the other station either an information frame or a checkpoint frame with the RR-bit set; and suppressing the transmission of a checkpoint frame from a station, when the checkpoint signal occurs, in all other cases.

4. Method in accordance with claim 3, comprising the additional steps of:

suppressing in a station said checkpoint signal indicating regular intervals for transmission of checkpoint frames, if all information frames the respective station has transmitted were acknowledged by the contents of checkpoint frames from the other station, and if it did not receive, during the last previous checkpoint signal interval, or during a preselected number of previous consecutive checkpoint intervals, from the other station either an information frame or a checkpoint frame with the RR-bit set; and resuming provision of said checkpoint signal indicating regular intervals for the transmission of checkpoint frames when the respective station transmits an information frame or when it receives from the other station either an information frame or a checkpoint frame with the RR-bit set.

* * * * *